US012591093B2

(12) United States Patent
Triplett

(10) Patent No.: US 12,591,093 B2
(45) Date of Patent: Mar. 31, 2026

(54) FACILITATING OPTICAL COUPLING AND BEAM COLLIMATION IN PHOTONIC INTEGRATED CIRCUITS

(71) Applicant: GM Cruise Holdings LLC, San Francisco, CA (US)

(72) Inventor: Mark Triplett, Mountain View, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 284 days.

(21) Appl. No.: 18/355,307

(22) Filed: Jul. 19, 2023

(65) Prior Publication Data

US 2025/0028122 A1     Jan. 23, 2025

(51) Int. Cl.
G02B 6/124          (2006.01)
G02B 6/30           (2006.01)
(Continued)

(52) U.S. Cl.
CPC .............. G02B 6/124 (2013.01); G02B 6/30 (2013.01); G02B 6/34 (2013.01); G01S 7/481 (2013.01);
(Continued)

(58) Field of Classification Search
CPC .. G02B 6/124; G02B 6/30; G02B 6/34; G01S 7/481
See application file for complete search history.

(56) References Cited

U.S. PATENT DOCUMENTS 5,410,622 A * 4/1995 Okada ..................... H10F 77/70
                                              257/E31.127
12,001,120 B1 * 6/2024 Zhang ..................... G02F 1/313
(Continued)

FOREIGN PATENT DOCUMENTS

CN      106680932 A  *  5/2017
CN      113253386 A  *  8/2021
CN      117130095 A  *  11/2023

OTHER PUBLICATIONS

F. Van Laere et al. Compact and highly efficient grating couplers between optical fiber and nanophotonic waveguides. Journal of Lightwave Technology, 25:1, 151-156, Jan. 2007 (https://doi.org/10.1109/JLT.2006.888164) (Year: 2007).*
(Continued)

*Primary Examiner* — Michael Stahl
(74) *Attorney, Agent, or Firm* — CANTOR COLBURN LLP

(57)          ABSTRACT

Aspects of the subject technology relate to structures and methods for facilitating optical coupling and beam collimation in photonic integrated circuits. A photonic structure can include a waveguide and a grating coupling structure coupled to the waveguide for emitting first electromagnetic radiation fed through the waveguide into a first region adjacent to a first side of the grating coupler structure and second electromagnetic radiation fed through the waveguide into a second region adjacent to a second side of the grating coupler structure. The structure can also include a reflection structure disposed in the first region adjacent to the first side of the grating coupler structure and configured to reflect at least a portion of the first electromagnetic radiation back through the first region, the grating coupler structure, and into the second region.

20 Claims, 7 Drawing Sheets

(51) Int. Cl.
| | | |
|---|---|---|
| *G02B 6/34* | (2006.01) | |
| *G01S 7/481* | (2006.01) | |
| *G02B 6/12* | (2006.01) | |

(52) U.S. Cl.
CPC .............. *G02B 2006/12104* (2013.01); *G02B 2006/12107* (2013.01)

(56) References Cited

U.S. PATENT DOCUMENTS

| | | | | |
|---|---|---|---|---|
| 2004/0156589 A1* | 8/2004 | Gunn, III | .......... | G02B 6/12004 385/37 |
| 2009/0154871 A1* | 6/2009 | Pyo | ........................... | G02B 6/30 438/31 |
| 2013/0182998 A1* | 7/2013 | Andry | ................. | G02B 6/4204 385/33 |
| 2013/0209026 A1* | 8/2013 | Doany | .................... | G02B 6/32 438/32 |
| 2013/0279844 A1* | 10/2013 | Na | ......................... | G02B 6/124 438/27 |
| 2018/0113245 A1* | 4/2018 | Koch | .................... | G02B 6/0031 |
| 2018/0180807 A1* | 6/2018 | Melikyan | .............. | G02B 6/124 |
| 2018/0284343 A1* | 10/2018 | Melikyan | .............. | G02B 6/125 |
| 2018/0335566 A1* | 11/2018 | Menezo | .................. | G02B 6/34 |
| 2019/0207362 A1* | 7/2019 | Kong | ........................ | G02B 6/34 |
| 2021/0193564 A1* | 6/2021 | Song | ........................ | G02B 6/43 |
| 2021/0333491 A1* | 10/2021 | Menezo | .................. | G02B 6/34 |
| 2022/0128661 A1* | 4/2022 | Wang | .................... | G01S 7/4814 |
| 2022/0163639 A1* | 5/2022 | Lin | ........................ | G01S 7/4818 |
| 2022/0404562 A1* | 12/2022 | De Valicourt | .......... | G02B 6/30 |
| 2024/0045146 A1* | 2/2024 | Islam | .................... | G02B 6/124 |
| 2024/0069291 A1* | 2/2024 | Kuo | .................... | G02B 6/4215 |
| 2024/0113091 A1* | 4/2024 | Lo | ....................... | H01L 23/5226 |

OTHER PUBLICATIONS

N. Mangal et al. Performance evaluation of backside emitting O-band grating couplers for 100-μm-thick silicon photonics interposers. IEEE Photonics Journal, 11:3, 7101711, Jun. 2019 (https://doi.org/10.1109/JPHOT.2019.2918522) (Year: 2019).*

* cited by examiner

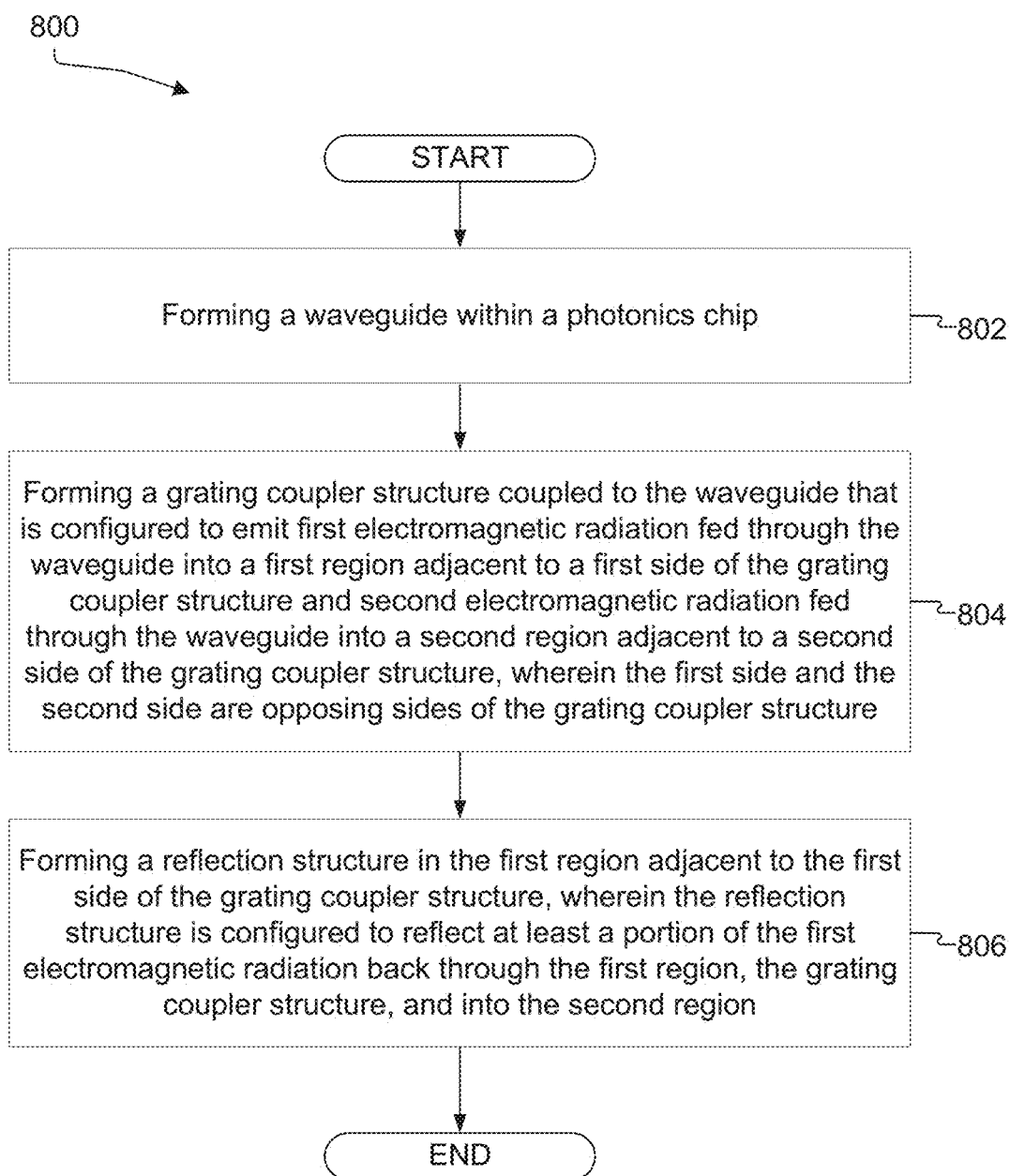

800

START

Forming a waveguide within a photonics chip — 802

Forming a grating coupler structure coupled to the waveguide that is configured to emit first electromagnetic radiation fed through the waveguide into a first region adjacent to a first side of the grating coupler structure and second electromagnetic radiation fed through the waveguide into a second region adjacent to a second side of the grating coupler structure, wherein the first side and the second side are opposing sides of the grating coupler structure — 804

Forming a reflection structure in the first region adjacent to the first side of the grating coupler structure, wherein the reflection structure is configured to reflect at least a portion of the first electromagnetic radiation back through the first region, the grating coupler structure, and into the second region — 806

END

FIG. 8

FACILITATING OPTICAL COUPLING AND BEAM COLLIMATION IN PHOTONIC INTEGRATED CIRCUITS

BACKGROUND

1. Technical Field

The present disclosure generally relates to improving vertical coupling efficiency and reducing complexity and cost in photonic systems using enhanced grating coupling structures and monolithic microlens elements for beam collimation in such photonic systems.

2. Introduction

Integrated circuits have been developed that integrate photonic components as part of a microchip to form a photonic integrated circuit. Photonic integrated circuits can perform applicable functions in relation to interacting with light, otherwise electromagnetic radiation, such as detecting light, generating light, transporting light, and processing light. Various industries utilize photonic integrated circuits. For example, photonic integrated circuits are used in data and telecommunication systems, biomedical devices, and automotive systems.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 8 illustrates a flowchart for an example method of manufacturing a photonic structure with improved vertical coupling efficiency according to some aspects of the disclosed technology;

DETAILED DESCRIPTION

Figure 1:
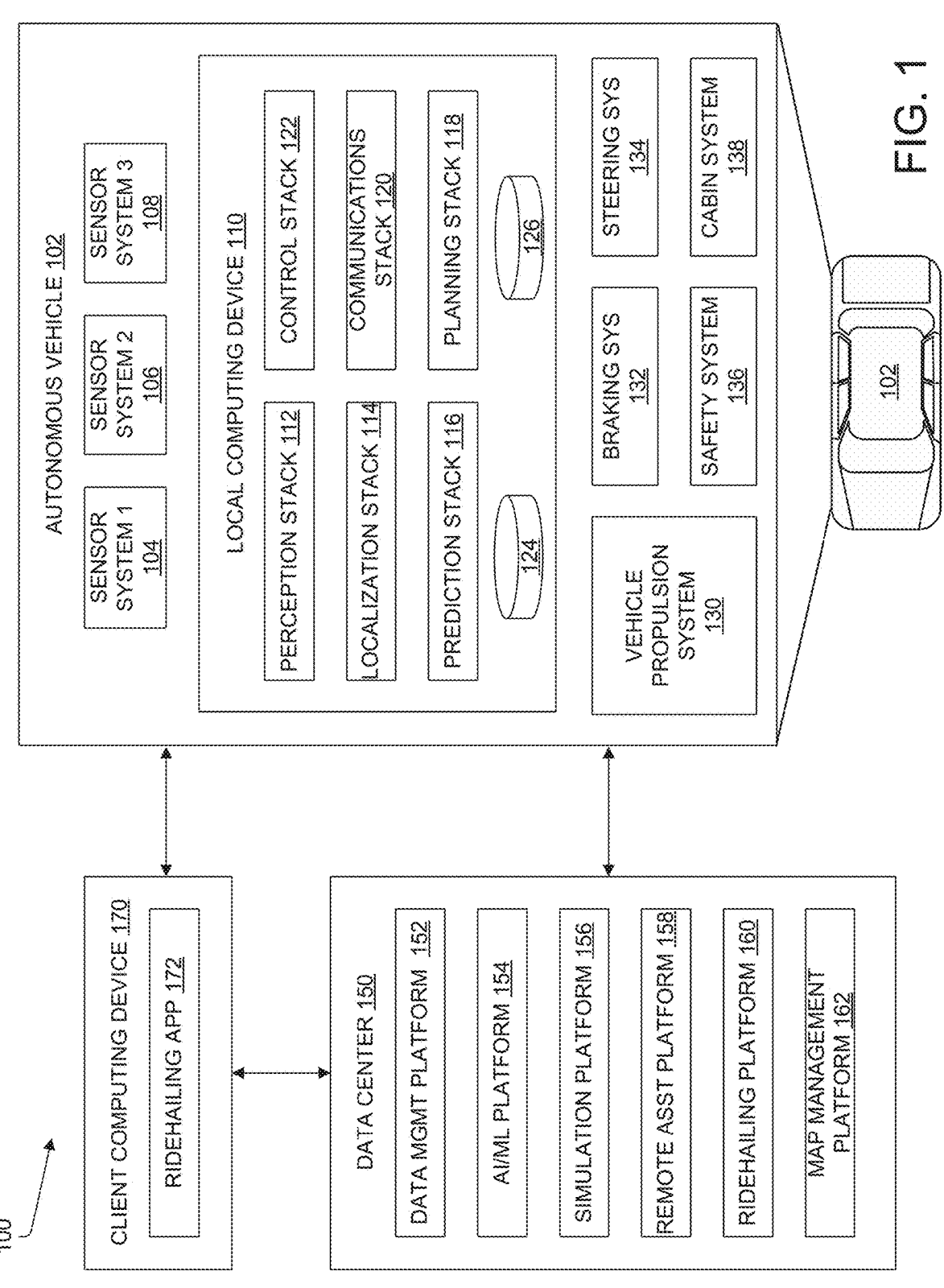
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicles (AVs) can navigate roadways without a human driver based on sensor signals generated by multiple sensor systems, as described in more detail below. The sensor systems can include one or more types of sensors that can be arranged about the AV, including but not limited to camera sensors. In some examples, the AV can interpret sensor signals to detect and classify objects in the environment using a perception stack, as explained in more detail below. The perception stack can enable the AV to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems as well as other data sources.

Some sensors that are utilized by AV vehicles are built from photonic systems. For example, LIDAR sensors use light that is generated, directed through, received and detected in photonic systems. Photonics can use vertical couplers to optically couple transmitted and received light. Vertical coupling in photonics can suffer from high insertion loss to fiber optic or free space modes due to nearly symmetric coupling between up and down directions with grating coupler structures. Further, beam divergences associated with vertical coupling can lead to a need for collimation optics to achieve reasonable optical system performance for many applications. However, collimation optics generally add additional packaging cost and complexity as they are manufactured in separate structures outside of the photonics chips. For these reasons, leveraging photonics for applications where multi-element arrays and therefore vertical coupling techniques are used can be prohibitively expensive and/or impractical.

The disclosed technology addresses the problems associated with coupling efficiency in vertical coupling structures. Further, the disclosed technology addresses the problems associated with collimation of light in systems that use vertical coupling structures. Specifically and as will be discussed in greater detail later, coupling can be achieved through reflective layers which can improve optical coupling efficiency in vertical coupling structures. Further and as will be discussed in greater detail later monolithically integrated microlensing elements can be integrated into handle wafers to aid in collimation and desired beam parameters, e.g. divergence, production.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the client application 172 to enable passengers to view the AV 102 in transit en route to a pick-up or drop-off location, and so on.

The technology described herein can be implemented with an applicable AV sensor, such as the sensors described with respect to the AV 102 operating in the AV environment 102 shown in FIG. 1. Further, the technology described herein can be implemented with an applicable photonic system. Specifically, the technology described herein can be implemented with an applicable sensor of an AV that is implemented through photonic systems, such as a LIDAR sensor.

Figure 2:
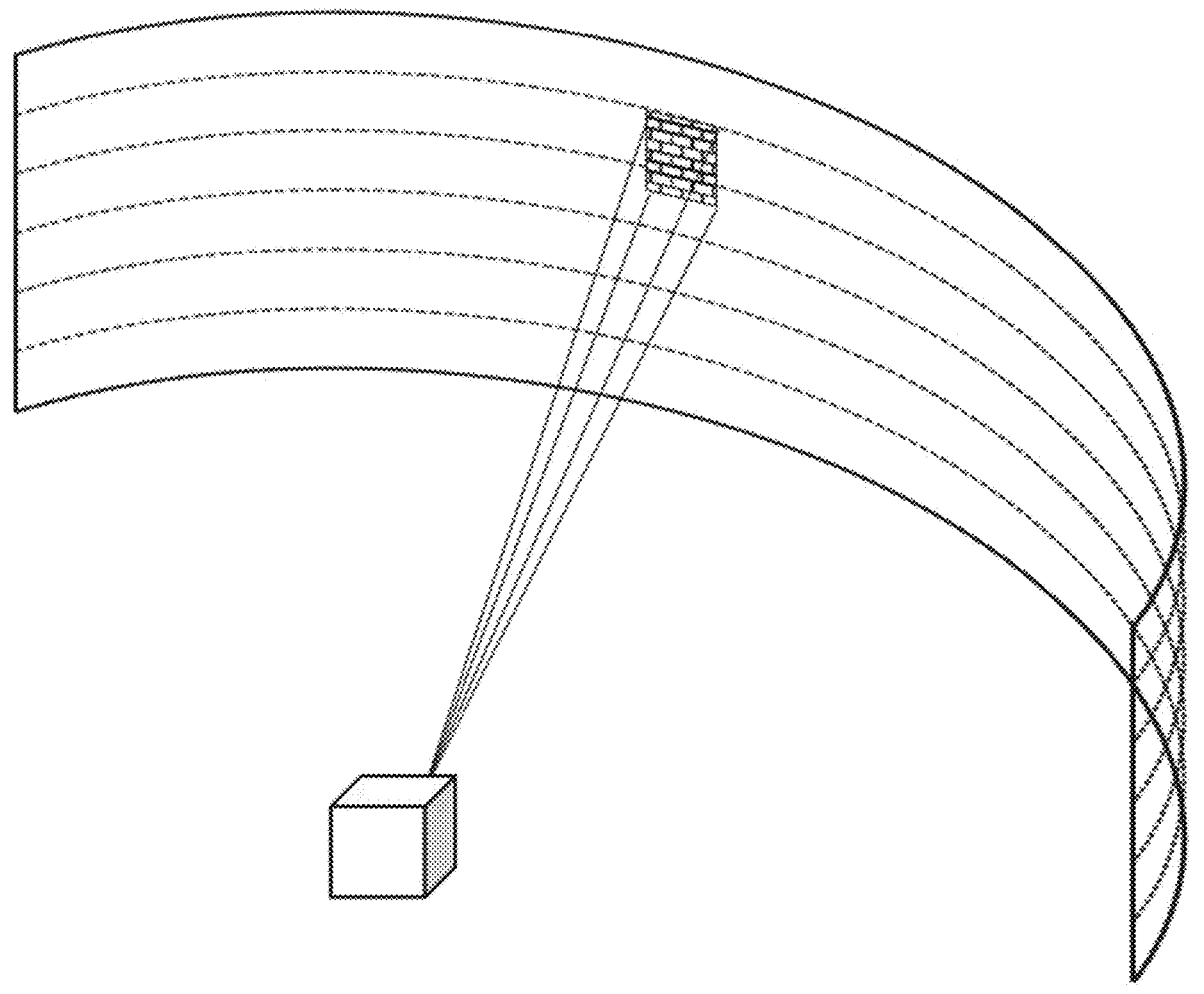
FIG. 2 illustrates an example LiDAR system, according to some aspects of the disclosed technology.

FIG. 2 illustrates an example LiDAR system, according to some aspects of the disclosed technology. The diagram shows the angular extent of a single optical structure, e.g. grating and microlens, that makes up a larger angular field of view for the LiDAR system. In certain embodiments, a single optical structure, according to the disclosure, could be used as an emitter. In certain embodiments, a single optical structure, according to the disclosure, could be used as a receiver. In certain embodiments, a single optical structure, according to the disclosure, could be used as an emitter and receiver together. In certain embodiments, the LiDAR system has multiple light emitter structures arranged in an array and multiple receiver structures arranged in an array, where the light from each emitter structure, after reflecting off of the target, is collected by a receiver structure. In certain embodiments, the LiDAR system has multiple emitter and receiver structures arranged in the same array, where light from each structure, after reflecting off of the target, is collected by the same structure.

Figures 3, 4:
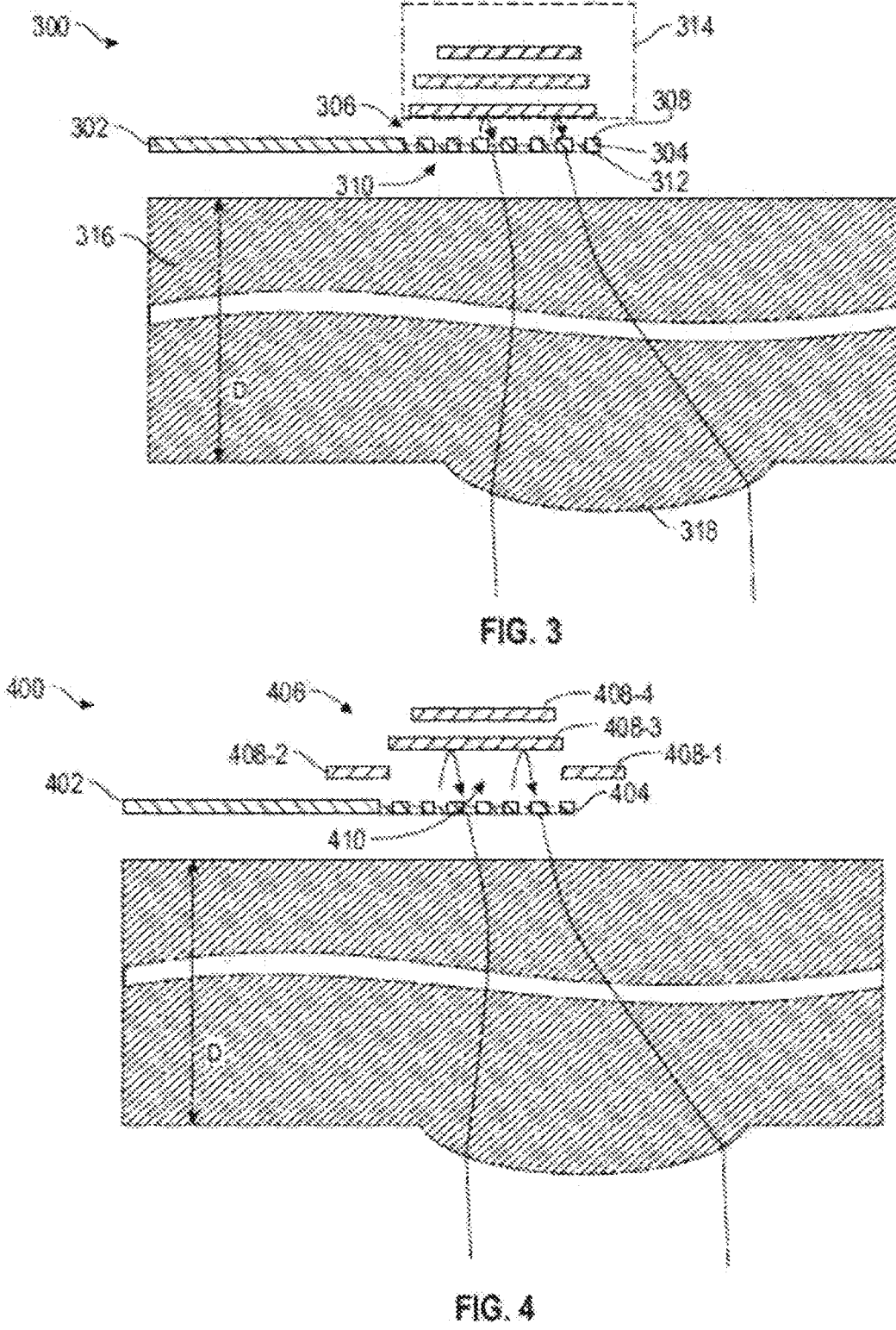
FIG. 3 illustrates a cross-sectional view of an example photonic structure, according to some aspects of the disclosed technology.
FIG. 4 illustrates a cross-sectional view of another example photonic structure, according to some aspects of the disclosed technology.

FIG. 3 illustrates a cross-sectional view of an example photonic structure 300, according to some aspects of the disclosed technology. The photonic structure 300 shown in FIG. 3 includes a waveguide 302 coupled to a grating coupler structure 304. The waveguide 302 can be comprised of a semiconductor material including, for example, silicon, germanium, or a combination thereof. The waveguide 302 and the grating coupler structure 304 are formed on, or otherwise formed within, a photonics wafer. The waveguide 302 functions to guide electromagnetic radiation between a photonics system interfaced to the waveguide 302 and the grating coupler structure 304.

The grating coupler structure 304 functions to couple the electromagnetic radiation that is guided by the waveguide 302 out of the plane of the waveguide 302. Specifically, the grating coupler structure 304 is a vertical coupling structure that can diffract electromagnetic radiation upward into a first region 306 adjacent to a first side 308 of the grating coupling structure 304. Further, the grating coupling structure 304 is a vertical coupling structure that can diffract electromagnetic radiation downward into a second region 310 adjacent to a second side 312 of the grating coupling structure 304.

As discussed previously, vertical couplers in photonics typically suffer from high insertion loss to fiber optic or free space modes due to nearly symmetric coupling between the up and down directions with grating coupler structures. Specifically, the intensity of the electromagnetic radiation that is transmitted upward into the first region 306 is similar to the intensity of electromagnetic radiation that is transmitted downward into the second region 310. As a result, a fiber that is coupled to the grating coupler structure 304 through the top of the grating coupler structure 304, e.g. through the first side 308, will not receive a substantial portion, if not all of the electromagnetic radiation that is transmitted downward into the second region 310. Likewise, a fiber that is coupled to the grating coupler structure 304 through the bottom of the grating coupler structure 304, e.g. through the second side 312, will receive a substantial portion, if not all of the electromagnetic radiation that is transmitted upward into the first region 306.

The photonic structure 300 described herein includes a reflection structure 314. The reflection structure 314 includes a plurality of reflective layers. Specifically, the reflection structure 314 in the example photonic structure 300 shown in FIG. 3 includes three reflective layers positioned on top of each other in a stacked manner. While only three reflective layers are shown in the photonic structure 300, in various embodiments, a reflection structure 314 can include more or fewer reflective layers, as will be described in greater detail later.

The reflection structure 314 can account for the high insertion loss to fiber optic or free space modes of vertical coupling structures by reflecting diffracted electromagnetic radiation back into the grating coupler structure 304 and out the opposing side of the grating coupler structure 304. Specifically, the reflection structure 314 is formed in the first region 306. The first region 306 can be part of a cladding layer such that the reflection structure 314 is formed in the cladding layer of the photonic structure 300. The reflection structure 314 can be positioned in the first region 306 and above the grating coupler structure 304 to reflect all or a portion of electromagnetic radiation that is diffracted upward into the first region 306 by the grating coupler structure 304. Specifically, the reflection structure 314 can reflect the electromagnetic radiation back through the first region 306 and into the second region 310. More specifically, the reflection structure 314 can reflect the electromagnetic radiation back through the first region 306 and into the second region 310 through the grating coupler structure 304. In turn, a fiber or free space mode that is coupled to the bottom of the grating coupler structure 304 can receive the electromagnetic radiation that is diffracted by the grating coupler structure 304 downward through the second side 312. Further, the fiber or free space mode can receive the electromagnetic radiation that is initially diffracted by the grating coupler structure 304 upward into the first region 306 and then reflected downward into the second region 310 by the reflection structure 314. This can improve or otherwise account for the high insertion loss of vertical coupling structures, e.g. in comparison to vertical coupling structures that simply diffract radiation upwards and downwards without reflecting any of the upward diffracted electromagnetic radiation back toward the vertical coupling structures.

Reflective layers forming reflective structures described herein, e.g. the reflection structure 314, can be fabricated from an applicable material for reflecting electromagnetic radiation dispersed by the grating coupler structure 304. Specifically, reflective layers can be fabricated from metals that strongly reflect light. Further, the reflective layers can perform other applicable functions in chips integrating the photonic systems described herein. Specifically, the reflective layers can serve as electrical conductors, e.g. interconnects, in a chip integrating the photonic structure 300 to a larger photonic system. More specifically, the reflective layers can serve as interconnects in multi-level interconnects of a chip integrating the photonic structure 300.

In the example photonic structure 300 shown in FIG. 3, electromagnetic radiation passes through a handle wafer 316, e.g. bulk optical material, before passing from the photonic structure 300. The photonic structure 300 can include a microlens element 318 that is formed on the backside of the photonic structure 300. Specifically, the microlens element 318 can be formed on the backside of the handle wafer 316 adjacent to the second region 310.

The microlens element 318 can be formed through an applicable technique for forming microlenses in a substate. Specifically, the microlens element 318 can be formed through an applicable lithography technique, such as photolithography. Further, the microlens element 318 can be formed through an applicable etching technique. For example, a mask can be applied to the desired location of the microlens element 318. Further in the example, a selective surface modification method, such as selective etching, can be applied to remove layers of the handle wafer 316 outside of the mask more effectively than layers under the mask layers thereby modifying the shape of the handle wafer under the mask in a desired way. For example, a spherically shaped mask element can be used which will enable a spherically shaped microlens to be formed in the handle wafer layers under the mask element through the etching technique. Photoresist can be used to make the mask element with a desired shape by adjusting the width and thickness of mask/shape through deposition, patterning, reflow and hardbake steps. The mask can then be removed to leave the microlens element 318.

The microlens element 318 functions to affect the electromagnetic radiation that passes through the handle wafer 316 from the grating coupler structure 304. In particular, the microlens element 318 can affect the electromagnetic radiation that is dispersed downward from the grating coupler structure 304 through the second side 312. Further, the microlens element 318 can affect the electromagnetic radiation that is dispersed upward from the grating coupler structure 304 and reflected downward into the second region 310 by the reflection structure 314. In affecting the electromagnetic radiation, the microlens element 318 can function to optically condition or collimate the radiation that leaves the handle wafer 316 as part of the photonic structure 300. Use of the microlens element 318 is advantageous as the electromagnetic radiation can diverge as the radiation passes through and leaves the handle wafer 316.

FIG. 4 illustrates a cross-sectional view of another example photonic structure 400, according to some aspects of the disclosed technology. The photonic structure 400 shown in FIG. 4 includes a waveguide 402 coupled to a grating coupler structure 404. The waveguide 402 and the grating coupler structure 404 are formed on, or otherwise formed within, a photonics wafer. The waveguide 402 functions to guide electromagnetic radiation to or from a photonics system and route it through the photonics structure 400 to the grating coupler structure 404.

The photonic structure 400 can include applicable components and function according to the other photonic structures described herein. Specifically, the photonic structure 400 includes a reflection structure 406 that functions to reflect electromagnetic radiation that is dispersed by the grating coupler structure 404. The reflection structure 406 includes a first reflective layer 408-1, a second reflective layer 408-2, a third reflective layer 408-3, and a fourth reflective layer 408-4 (collectively referred to as "reflective layers 408"). The first reflective layer 408-1 and the second reflective layer 408-2 are positioned in the same plane. The third reflective layer 408-3 and the fourth reflective layer 408-4 are positioned in planes above the plane containing the first reflective layer 408-1 and the second reflective layer 408-2. The reflective layers 408 can define a reflection region 410 within a region above the grating coupler structure 404. Radiation that is transmitted upward in the reflection region 410 can be reflected by the reflective layers 408 in the reflection structure 406 downward towards the handle wafer.

Figure 5:
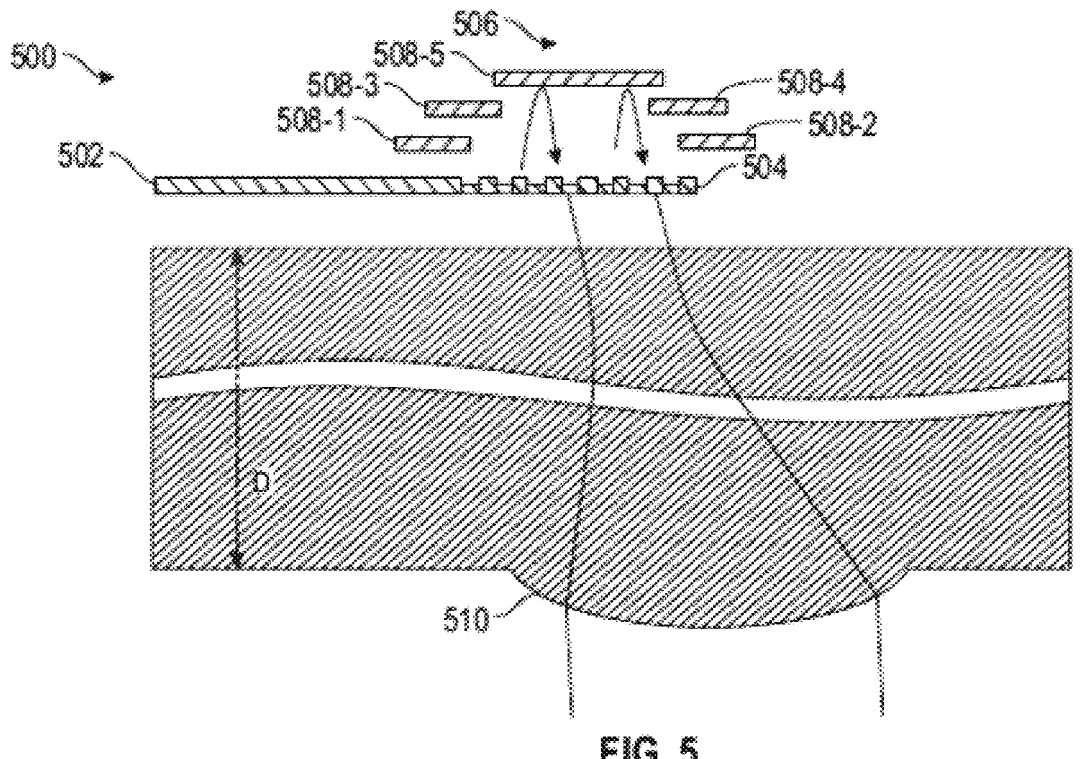
FIG. 5 illustrates a cross-sectional view of another example photonic structure, according to some aspects of the disclosed technology.

FIG. 5 illustrates a cross-sectional view of another example photonic structure 500, according to some aspects of the disclosed technology. The photonic structure 500 shown in FIG. 5 includes a waveguide 502 coupled to a grating coupler structure 504. The waveguide 502 and the grating coupler structure 504 are formed on, or otherwise formed within, a photonics wafer. The waveguide 502 functions to guide electromagnetic radiation to or from a photonic system and route it through the photonics structure 500 to the grating coupler structure 504.

The photonic structure 500 can include applicable components and function according to the other photonic structure described herein. Specifically, the photonic structure 500 includes a reflection structure 506 that functions to reflect electromagnetic radiation that is dispersed by the grating coupler structure 504. The reflection structure 506 includes a first reflective layer 508-1, a second reflective layer 508-2, a third reflective layer 508-3, a fourth reflective layer 508-4, and a fifth reflective layer 508-5 (collectively referred to as "reflective layers 508"). The first reflective layer 508-1 and the second reflective layer 508-2 can be formed in a first plane. The third reflective layer 508-3 and the fourth reflective layer 508-4 can be formed in a second plane above the first plane containing the first reflective layer 508-1 and the second reflective layer 508-2. The fifth reflective layer 508-5 can be formed in a third plane above the planes that include the first reflective layer 508-1, the second reflective layer 508-2, the third reflective layer 508-3, and the fourth reflective layer 508-4. The reflective layers 508 can define a reflection region that is angled with respect to a microlens element 510 formed on the handle wafer.

Figure 6:
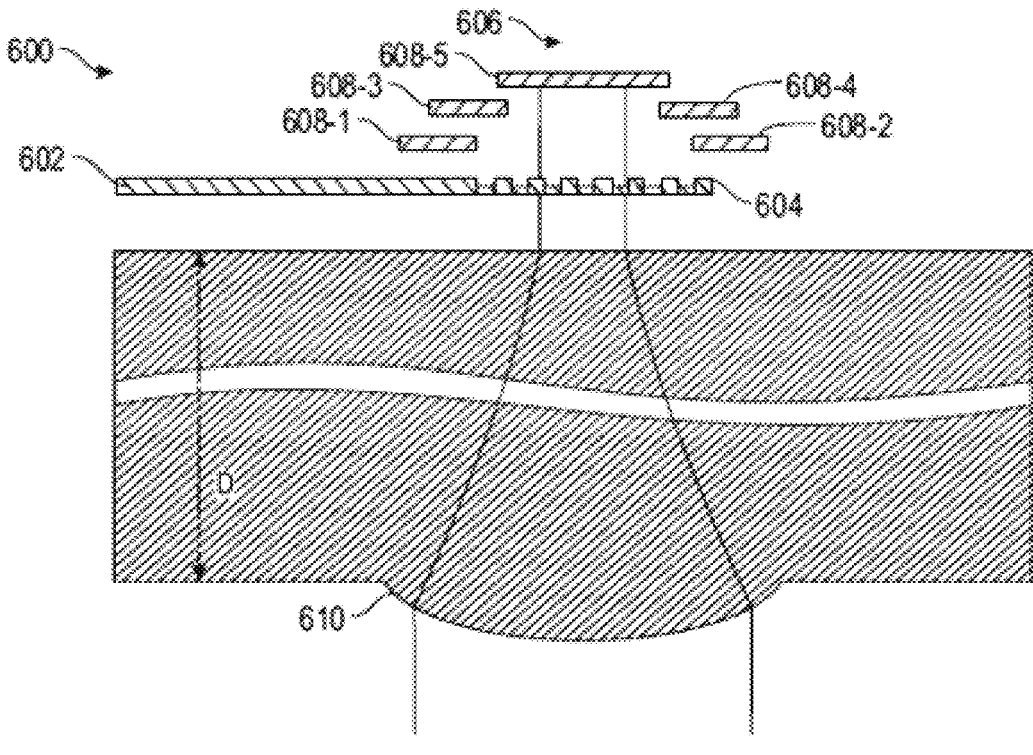
FIG. 6 illustrates a cross-sectional view of another example photonic structure, according to some aspects of the disclosed technology.

FIG. 6 illustrates a cross-sectional view of another example photonic structure 600, according to some aspects of the disclosed technology. The photonic structure 600 shown in FIG. 6 includes a waveguide 602 coupled to a grating coupler structure 604. The waveguide 602 and the grating coupler structure 604 are formed on, or otherwise formed within, a photonics wafer. The waveguide 602 functions to guide electromagnetic radiation to or from a photonic system and route it through the photonics structure 600 to the grating coupler structure 604.

The photonic structure 600 can include applicable components and function according to the other photonic structures described herein. Specifically, the photonic structure 600 includes a reflection structure 606 that functions to reflect electromagnetic radiation that is dispersed by the grating coupler structure 604. The reflection structure 606 includes a first reflective layer 608-1, a second reflective layer 608-2, a third reflective layer 608-3, a fourth reflective layer 608-4, and a fifth reflective layer 608-5 (collectively referred to as "reflective layers 608"). The first reflective layer 608-1 and the second reflective layer 608-2 can be formed in a first plane. The third reflective layer 608-3 and the fourth reflective layer 608-4 can be formed in a second plane above the first plane containing the first reflective layer 608-1 and the second reflective layer 608-2. The fifth reflective layer 608-5 can be formed in a third plane above the planes that include the first reflective layer 608-1, the second reflective layer 608-2, the third reflective layer 608-3, and the fourth reflective layer 608-4. The reflective layers 608 can define a reflection region that is substantially aligned along a common axis with respect to a microlens element 610 formed on the handle wafer.

Figure 7:
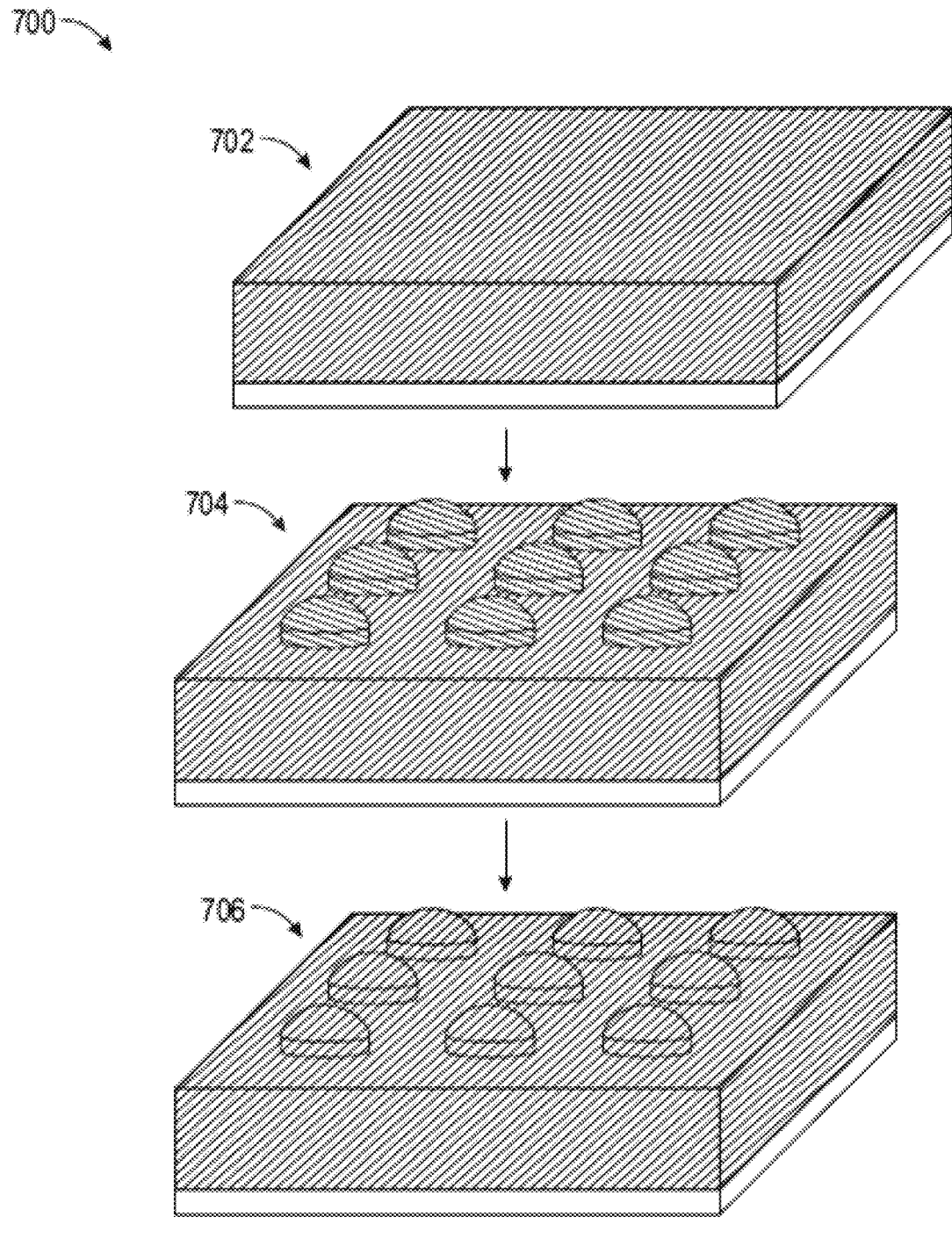
FIG. 7 illustrates a conceptual flow of semiconductor processing steps for forming a microlens array on the bottom of a handle wafer supporting an array of photonic structures according to some aspects of the disclosed technology.

FIG. 7 illustrates a conceptual flow of semiconductor processing steps for forming an array of microlenses on the bottom of a handle wafer supporting an array of photonic structures. The array of photonic structures can include an array of photonic structures with vertical optical couplers, such as the photonic structures described herein. At operation 702, a chip supporting or capable of supporting the array of photonic structures is accessed. At operation 704, masks are added at the desired positions of the microlenses in the array of microlenses. At operation 706, a surface modification technique is applied to selectively etch the wafer around the masks and underneath the masks at different rates. The masks are then removed leaving the wafer with the array of microlenses formed into the wafer. Each microlens in the array of microlenses can uniquely correspond to a single photonic structure in the array of photonic structures. In particular, a single microlens can correspond to a grating coupler structure, otherwise photonic structure. As follows, each single microlens can only affect, condition, or otherwise collimate electromagnetic radiation that is diffracted through its corresponding grating coupler structure.

The disclosure now continues with a discussion of manufacturing a photonic system with improved coupling efficiency. Specifically, FIG. 8 illustrates a flowchart 800 for an example method of manufacturing a photonic structure with improved vertical coupling efficiency. The method shown in FIG. 8 is provided by way of example, as there are a variety of ways to carry out the method. Additionally, while the example method is illustrated with a particular order of operations, those of ordinary skill in the art will appreciate that FIG. 8 and the modules shown therein can be executed in any order and can include fewer or more modules than illustrated. Each module shown in FIG. 8 represents one or more operations, processes, methods or routines in the method.

At operation 802, a waveguide is formed within a photonics chip. The waveguide can be formed using applicable semiconductor processing techniques. Specifically, the waveguide can be formed using applicable photonics processing techniques.

At operation 804, a grating coupler structure coupled to the waveguide is formed. The grating coupler structure can be configured to emit first electromagnetic radiation fed through the waveguide into a first region adjacent to a first side of the grating coupler structure. The grating coupler structure can also be configured to emit second electromagnetic radiation fed through the waveguide into a second region adjacent to a second side of the grating coupler structure that opposes the first side.

At operation 806, a reflection structure is formed in the first region adjacent to the first side of the grating coupler structure. The reflection structure can be an applicable structure for reflecting the first electromagnetic radiation in the first region, such as the reflection structures described herein. Specifically, the reflection structure can reflect the first electromagnetic radiation back through the first region and into the second region, e.g. through the grating coupler structure.

Design parameters of the reflection structure can be selected based on conditions associated with reflecting the electromagnetic radiation through the handle wafer. Specifically, the design parameters of the reflection structure can be selected based on factors associated with optically conditioning, e.g. through a microlens, the first electromagnetic radiation that is reflected downward with the second electromagnetic radiation that is transmitted downward. For example, design parameters of the reflection structure can be selected to focus the first electromagnetic radiation towards a microlens. Design parameters include applicable parameters related to the manufacture of the reflection structure that ultimately affect operation of the reflection structure. For example, design parameters can include a shape of the reflection structure, materials used in the reflection structure, and a position of the reflection structure, e.g. relative to the grating coupler structure.

Figure 9:
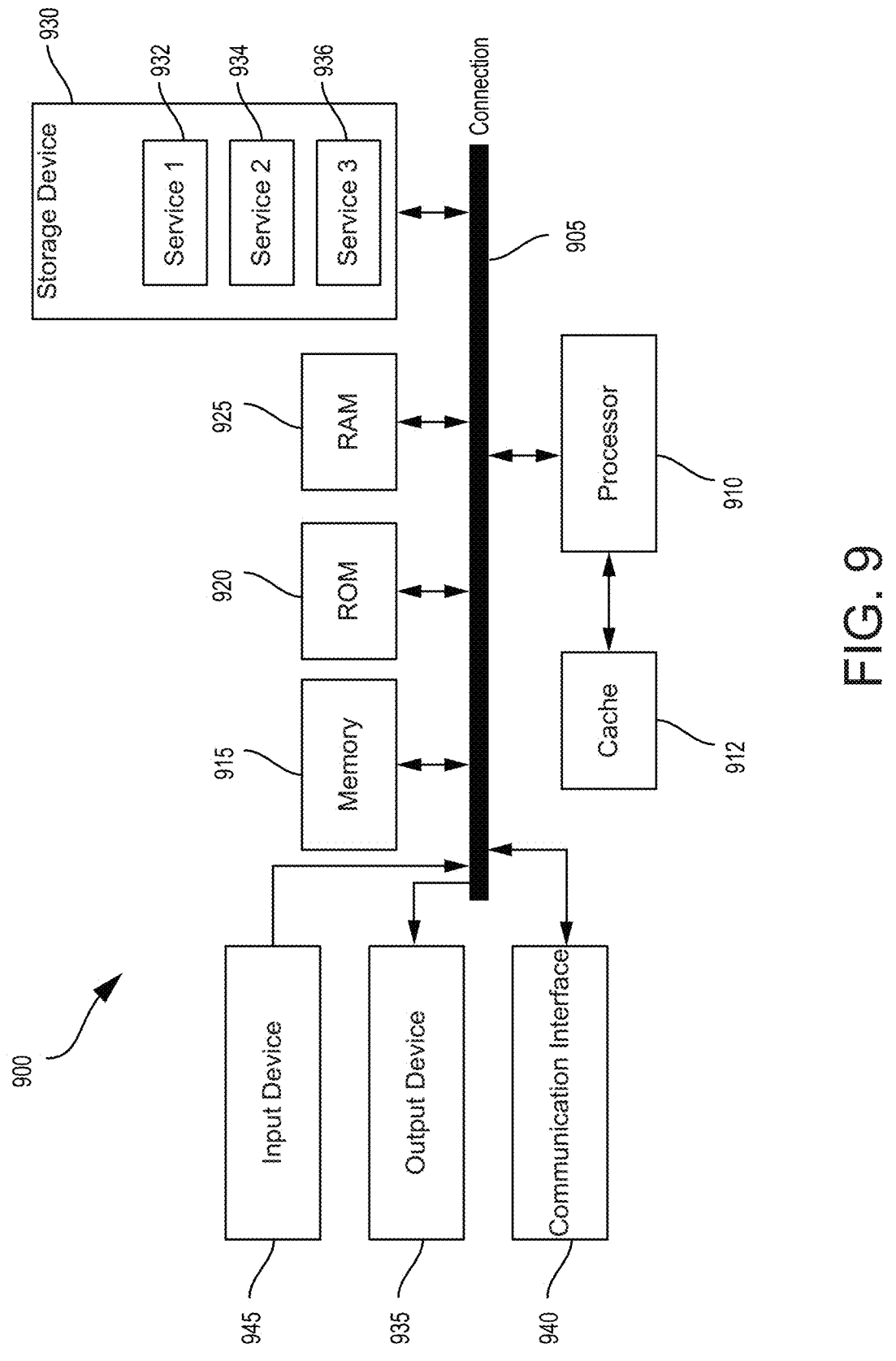
FIG. 9 illustrates an example processor-based system with which some aspects of the subject technology can be implemented.

FIG. 9 illustrates an example processor-based system with which some aspects of the subject technology can be implemented. For example, processor-based system 900 can be any computing device making up, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLO- NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 930 can include software services, servers, services, etc., that when the code that defines such software is executed by the processor 910, it causes the system 900 to perform a function. In some embodiments, a hardware service that performs a particular function can include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Illustrative examples of the disclosure include:

Aspect 1. A photonic structure comprising: a waveguide; a grating coupler structure coupled to the waveguide and configured to emit first electromagnetic radiation fed through the waveguide into a first region adjacent to a first side of the grating coupler structure and second electromagnetic radiation fed through the waveguide into a second region adjacent to a second side of the grating coupler structure, wherein the first side and the second side are opposing sides of the grating coupler structure; and a reflection structure disposed in the first region adjacent to the first side of the grating coupler structure and configured to reflect at least a portion of the first electromagnetic radiation back through the first region, the grating coupler structure, and into the second region.

Aspect 2. The photonic structure of Aspect 1, wherein the reflection structure includes a plurality of reflective layers formed in a cladding layer.

Aspect 3. The photonic structure of Aspect 2, wherein the reflective layers define a reflection region within the first region for reflecting the at least a portion of the first electromagnetic radiation back through the first region, the grating coupler structure, and into the second region.

Aspect 4. The photonic structure of any of Aspects 2 and 3, wherein the reflective layers are interconnects in a chip integrating the photonic structure.

Aspect 5. The photonic structure of any of Aspects 2 through 4, wherein the reflective layers are interconnects as part of multi-level interconnects in a chip integrating the photonic structure.

Aspect 6. The photonic structure of any of Aspects 2 through 5, wherein design parameters of the reflective layers are selected based on factors associated with optically conditioning, through a microlens element, the second electromagnetic radiation with the at least a portion of the first electromagnetic radiation that is reflected from the first region into the second region.

Aspect 7. The photonic structure of any of Aspects 1 through 6, further comprising a microlens element formed on a backside of the photonic system adjacent to the second region, wherein the microlens element is configured to affect the second electromagnetic radiation and the at least a portion of the first electromagnetic radiation that is reflected from the first region into the second region.

Aspect 8. The photonic structure of Aspect 2, wherein the microlens element is formed in a handle layer of the backside of the photonic structure.

Aspect 9. The photonic structure of any of Aspects 7 and 8, wherein the microlens element is configured to collimate the second electromagnetic radiation and at least a portion of the first electromagnetic radiation that is reflected from the first region into the second region.

Aspect 10. The photonic structure of any of Aspects 7 and 9, wherein the microlens element is specific to the grating coupler structure and the reflection structure.

Aspect 11. A method of fabricating a photonic structure comprising: forming a waveguide within a photonics chip; forming a grating coupler structure coupled to the waveguide that is configured to emit first electromagnetic radiation fed through the waveguide into a first region adjacent to a first side of the grating coupler structure and second electromagnetic radiation fed through the waveguide into a second region adjacent to a second side of the grating coupler structure, wherein the first side and the second side are opposing sides of the grating coupler structure; and forming a reflection structure in the first region adjacent to the first side of the grating coupler structure, wherein the reflection structure is configured to reflect at least a portion of the first electromagnetic radiation back through the first region, the grating coupler structure, and into the second region.

Aspect 12. The method of Aspect 11, wherein the reflection structure includes a plurality of reflective layers formed in a cladding layer.

Aspect 13. The method of Aspect 12, wherein the reflective layers define a reflection region within the first region for reflecting at least a portion of the first electromagnetic radiation back through the first region, the grating coupler structure, and into the second region.

Aspect 14. The method of any of Aspects 12 and 13, wherein the reflective layers are interconnects in a chip integrating the photonic structure.

Aspect 15. The method of any of Aspects 12 through 14, wherein the reflective layers are interconnects as part of multi-level interconnects in a chip integrating the photonic structure.

Aspect 16. The method of any of Aspects 12 through 15, further comprising selecting design parameters of the reflective layers based on factors associated with optically conditioning, through a microlens element, the second electromagnetic radiation with at least a portion of the first electromagnetic radiation that is reflected from the first region into the second region.

Aspect 17. The method of Aspect 11, further comprising forming a microlens element on a backside of the photonic structure adjacent to the second region, wherein the microlens element is configured to affect the second electromagnetic radiation and at least a portion of the first electromagnetic radiation that is reflected from the first region into the second region.

Aspect 18. The method of Aspect 17, wherein the microlens element is formed in a handle layer of the backside of the photonic structure.

Aspect 19. The method of any of aspects Aspect 17 and 18, wherein the microlens element is configured to collimate the second electromagnetic radiation and at least a portion of the first electromagnetic radiation that is reflected from the first region into the second region.

Aspect 20. The method of any of aspects Aspect 17 through 19, wherein the microlens element is specific to the grating coupler structure and the reflection structure.

Aspect 21. A system comprising means for performing a method according to any of Aspects 11 through 20.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A photonic structure comprising:
   a waveguide;
   a grating coupler structure coupled to the waveguide and configured to emit first electromagnetic radiation fed through the waveguide into a first region adjacent to a first side of the grating coupler structure and second electromagnetic radiation fed through the waveguide into a second region adjacent to a second side of the grating coupler structure, wherein the first side and the second side are opposing sides of the grating coupler structure; and
   a reflection structure disposed in the first region adjacent to the first side of the grating coupler structure and configured to reflect the first electromagnetic radiation back through the first region, the grating coupler structure, and into the second region, wherein the reflection structure includes a plurality of reflective layers defining a reflection region within the first region for reflecting the first electromagnetic radiation back through the first region, the grating coupler structure, and into the second region, the plurality of reflective layers including:
   a first layer disposed in a first plane, and a second layer disposed in the first plane, the second layer separated from the first layer in the first plane; and
   at least one third layer formed in at least one second plane parallel to the first plane and located above the first plane, wherein each of the first layer, the second layer and the at least one third layer are configured to reflect a portion of the first electromagnetic radiation back through the first region, the grating coupler structure, and into the second region.

2. The photonic structure of claim 1, wherein the plurality of reflective layers are formed in a cladding layer.

3. The photonic structure of claim 1, wherein the reflection region is angled with respect to a microlens element.

4. The photonic structure of claim 1, wherein the plurality of reflective layers are interconnects in a chip integrating the photonic structure.

5. The photonic structure of claim 1, wherein the plurality of reflective layers are interconnects as part of multi-level interconnects in a chip integrating the photonic structure.

6. The photonic structure of claim 1, wherein design parameters of the plurality of reflective layers are selected based on factors associated with optically conditioning, through a microlens element, the second electromagnetic radiation with the first electromagnetic radiation that is reflected from the first region into the second region.

7. The photonic structure of claim 1, further comprising a microlens element formed on a backside of the photonic structure adjacent to the second region, wherein the micro-lens element is configured to affect the second electromagnetic radiation and the first electromagnetic radiation that is reflected from the first region into the second region.

8. The photonic structure of claim 7, wherein the micro-lens element is formed in a handle layer of the backside of the photonic structure.

9. The photonic structure of claim 7, wherein the micro-lens element is configured to collimate the second electromagnetic radiation and the first electromagnetic radiation that is reflected from the first region into the second region.

10. The photonic structure of claim 7, wherein the micro-lens element is specific to the grating coupler structure and the reflection structure.

11. A method of fabricating a photonic structure comprising:

forming a waveguide within a photonics chip;

forming a grating coupler structure coupled to the wave-guide that is configured to emit first electromagnetic radiation fed through the waveguide into a first region adjacent to a first side of the grating coupler structure and second electromagnetic radiation fed through the waveguide into a second region adjacent to a second side of the grating coupler structure, wherein the first side and the second side are opposing sides of the grating coupler structure; and forming a reflection structure in the first region adjacent to the first side of the grating coupler structure, wherein the reflection structure is configured to reflect the first electromagnetic radiation back through the first region, the grating coupler structure, and into the second region, wherein the reflection structure includes a plu-rality of reflective layers defining a reflection region within the first region for reflecting the first electro-magnetic radiation back through the first region, the grating coupler structure, and into the second region, the plurality of reflective layers including:

a first layer disposed in a first plane, and a second layer disposed in the first plane, the second layer separated from the first layer in the first plane; and at least one third layer formed in at least one second plane parallel to the first plane and located above the first plane, wherein each of the first layer, the second layer and the at least one third layer are configured to reflect a portion of the first electromagnetic radia-tion back through the first region, the grating coupler structure, and into the second region.

12. The method of claim 11, wherein the plurality of reflective layers are formed in a cladding layer.

13. The method of claim 11, wherein the-reflection region is angled with respect to a microlens element.

14. The method of claim 11, wherein the reflective layers are interconnects in a chip integrating the photonic structure.

15. The method of claim 11, wherein the reflective layers are interconnects as part of multilevel interconnects in a chip integrating the photonic structure.

16. The method of claim 11, further comprising selecting design parameters of the reflective layers based on factors associated with optically conditioning, through a microlens element, the second electromagnetic radiation with the first electromagnetic radiation that is reflected from the first region into the second region.

17. The method of claim 11, further comprising forming a microlens element on a backside of the photonic structure adjacent to the second region, wherein the microlens ele-ment is configured to affect the second electromagnetic radiation and the first electromagnetic radiation that is reflected from the first region into the second region.

18. The method of claim 17, wherein the microlens element is formed in a handle layer of the backside of the photonic structure.

19. The method of claim 17, wherein the microlens element is configured to collimate the second electromag-netic radiation and at least a portion of the first electromag-netic radiation that is reflected from the first region into the second region.

20. The method of claim 17, wherein the microlens element is specific to the grating coupler structure and the reflection structure.

* * * * *